United States Patent [19]
Setlock et al.

[11] Patent Number: 5,858,218
[45] Date of Patent: Jan. 12, 1999

[54] MACHINE TOOL COOLANT RECLAMATION SYSTEM EMPLOYING A CONVEYOR DISCHARGING SEPARATED SOLIDS ONTO AN IMPINGEMENT SCREEN

[75] Inventors: Andrew T. Setlock, Wickliffe; Richard B. Reffner, Solon, both of Ohio

[73] Assignee: Kennametal Inc., Latrobe, Pa.

[21] Appl. No.: 767,395

[22] Filed: Dec. 16, 1996

[51] Int. Cl.⁶ .......................... B01D 29/00; B01D 33/04
[52] U.S. Cl. ........................ 210/167; 210/168; 210/171; 210/196; 210/197; 210/255; 210/262; 210/297; 210/348; 210/400; 210/409
[58] Field of Search .................... 210/167, 168, 210/171, 196, 197, 252, 255, 259, 262, 295, 297, 348, 400, 401, 409

[56] References Cited

U.S. PATENT DOCUMENTS

| | | | |
|---|---|---|---|
| Re. 7,039 | 4/1876 | Randon | 210/348 |
| 2,071,998 | 2/1937 | Buse | 210/348 |
| 2,450,006 | 9/1948 | Lesniak | 210/348 |
| 2,463,814 | 3/1949 | Skinner | 210/354 |
| 2,652,737 | 9/1953 | Longstreet . | |
| 2,885,080 | 5/1959 | Goldman | 210/400 |
| 3,455,457 | 7/1969 | Popelar | 210/168 |
| 3,950,562 | 4/1976 | Senior | 210/400 |
| 4,071,451 | 1/1978 | Wood | 210/168 |
| 4,253,281 | 3/1981 | Ruttenberg | 210/400 |
| 4,440,642 | 4/1984 | Frese et al. | 210/168 |
| 4,673,013 | 6/1987 | Saalasti | 210/400 |
| 4,679,295 | 7/1987 | Lopez . | |
| 4,751,006 | 6/1988 | Becker . | |
| 4,955,770 | 9/1990 | Kitamura . | |
| 5,078,256 | 1/1992 | Hatano et al. . | |
| 5,089,121 | 2/1992 | McWhinnie | 210/400 |
| 5,113,558 | 5/1992 | Soroka et al. . | |
| 5,167,839 | 12/1992 | Widner, II et al. . | |
| 5,205,686 | 4/1993 | de Caussin . | |
| 5,230,793 | 7/1993 | Lenhart et al. . | |
| 5,399,262 | 3/1995 | Hawkins et al. . | |
| 5,417,849 | 5/1995 | McEwen et al. | 210/168 |
| 5,425,876 | 6/1995 | Rector | 210/354 |
| 5,569,382 | 10/1996 | Reynders | 210/400 |
| 5,603,846 | 2/1997 | Uchiyama et al. | 210/168 |
| 5,662,812 | 9/1997 | McEwen | 210/805 |

OTHER PUBLICATIONS

A booklet submitted by J. W. Moore Process Equipment Co. to Marvin Hawkins (Jul. 18, 1990).
Sanborn . . . Pioneers in Recovery System Technology, a one page advertisement of Sanborn, Inc. (undated).
"Pratt and Witney Cuts Costs . . . With Coolant Purifiers", a one page excerpt from Automatic Machining, Feb., 1987.
"Pasteurization: Key to Quality Coolant Recycling", a four page document by George F. Williams et al., (Jul./Aug. 1986).
Two page brochure of Sanborn Inc. regarding its Patriot recovery system (undated).
Two page brochure of Monlan Corporation regarding its HWT Series (undated).

(List continued on next page.)

Primary Examiner—Robert Popovics
Attorney, Agent, or Firm—Stanislav Antolin

[57] ABSTRACT

A coolant reclamation device for use in conjunction with a conveyor of a first width wherein the conveyor receives solid contaminants and coolant from a machine tool operation. The conveyor transports the solid contaminants and coolant to the coolant reclamation device. The coolant reclamation device includes an elongate body which defines a chamber and contains an elongate opening which provides direct access to the chamber. The device also includes an elongate screen located over the opening. The coolant reclamation device is positioned relative to the conveyor so that the solid contaminants and coolant discharged from the conveyor impinge the screen whereby the solid contaminants remain on the surface of the screen and the coolant passes through the screen into the chamber. The elongate body contains a return port through which the chamber is in fluid communication with the coolant reservoir via a conduit.

13 Claims, 1 Drawing Sheet

OTHER PUBLICATIONS

"Integrated Coolant Recovery System", one page brochure of Monlan Corporation (undated).

"Mon–A–Vac Coolant Filtration Systems for Machine Tool Operations", four page brochure of Monlan Corporation (undated).

"Monlan Coolant Filtration System Increases Efficiency in Automotive Plant", one page technical bulletin of Monlan Corporation (undated).

"Free Trail Offer on Permanent Magnets in Stock", one page brochure of Eriez Manufacturing Co. 1987.

"America's Broadest Line . . . Metal Chip Conveyors and Coolant Filtration Systems", four page technical bulletin of Monlan Corporation (undated).

"Standard Hydroclones for the Metal Removal Industry", twelve page catalog of Monlan Corporation (Undated).

"Mon–A–Mag Magnetic Coolant Filters", four page catalog of Monlan Corporation (undated).

"Monlan Mon–A–Matic Vacuum Filter System", sixteen page catalog of Monlan Corporation (undated).

"Coolant Cycler", two page document of Monlan Corporation (undated).

"New Water–Based Coolant Reclaimer", Metalworking News (Sep. 5, 1988).

Hyde Guardian 200, two page brochure of Hyde Products, Inc. (undated).

"Guardian Coolant Recycling System", four page brochure of Guardian Products, Inc. (undated).

"Xybex System 1000", four paged brochure of Master Chemical Corporation (1876).

"Yellow Bellied Sump Sucker", four page brochure of Purification Systems, Inc. (undated).

"America's Broadest Line . . . Metal Chip Conveyors and Coolant Filtration Systems", four page technical bulletin of Monlan Corporation (undated).

"How the TrimSO1 Loop Coolant system Lowers Unit Cost", one page brochure of Master Chemical Corporation (undated).

"Free Trail Offer on Permanent Magnet Sheet Fanners", one page brochure of Eriez Manufacturing Co. (undated).

"Free Trail Offer on Rare Earth Magnetic Separators", one page brochure of Eriez Manufacturing Co. (1987).

"Free Trail Offer on Permanent Magnets in Stock", one page brochure of Eriez Manufacturing Co. (undated).

"Separation Vibratory, Metal detection and Magnamation Equipment" six page brochure of Eriez Manufacturing Co. (undated).

Five page brochure of Penberthy regarding its Mixer/Heater Model CTE (Jul. 1990).

"Design considerations" one page document of Penberthy (undated).

"Selection and Installation", one page document by Penberthy (undated).

5,858,218

MACHINE TOOL COOLANT RECLAMATION SYSTEM EMPLOYING A CONVEYOR DISCHARGING SEPARATED SOLIDS ONTO AN IMPINGEMENT SCREEN

BACKGROUND OF THE INVENTION

In a material (e.g., metal) removal operation (e.g., machining, milling, turning, drilling), a machine tool typically removes material from a workpiece in rather small pieces such as chips. As would be expected, the nature of material removal from a workpiece by a machine tool creates heat. As a consequence, a machine tool typically incorporates a cooling system in which a liquid coolant is directed at the workpiece and appropriate parts of the machine tool. It is also typical that the coolant along with the chips (i.e., solid contaminants)are removed from the vicinity of the machine tool.

Because of the cost of the coolant, there are arrangements to filter the chips from used coolant and then recycle the coolant back for reuse with the machine tool. In one such arrangement a conveyor, which receives the used coolant and chips from the machine tool, travels through a coolant reservoir. Although the intention is for the chips to remain on the conveyor and the coolant to drain away from the conveyor and into the reservoir, the fact of the matter is that not all of the coolant drains into the reservoir. The result is that the conveyor transports the chips, along with some of the coolant, and deposits the chips and the coolant into a chip hopper or the like. Thus, for example, the chip hopper may contain two to three pounds of chips along with ten to twenty gallons of coolant. For some machine tool operations, the conveyor remains in operation during times that the machine tool is not in operation. For this type of situation, the chip hopper may essentially contain only coolant.

It is typical that when the chip hopper is emptied the chips are separated from the coolant. The chips are stored in a central location until they are picked up for removal from the site. The coolant is also stored in a holding tank at a separate location until it is picked up for removal.

It thus becomes apparent that while this earlier arrangement removes chips from the coolant, it also removes a significant volume of coolant along with the chips. There are several drawbacks associated with this earlier arrangement due to the removal of a significant volume of coolant.

Because the coolant is expensive, the permanent loss of a significant volume of coolant results in a meaningful out-of-pocket expense. It would be desirable to provide an arrangement that does not result in the loss of a significant volume of coolant, and hence, leads to a decrease in the out-of-pocket expense due to the cost of the coolant.

The loss of a significant volume of coolant also results in an increased cost of labor associated with the requirement to fill the coolant reservoir more often. It also results in an increase in labor costs due to the need to empty the chip hopper more often because of the volume of coolant therein. There is an additional increase in labor expense because of the need to transport, and eventually remove from the site, the additional volume of coolant. In other words, the loss of a significant volume of coolant makes the machine tool operation much more labor-intensive, and as a result, increases the labor expense.

Hence, it would be highly desirable to provide an improved coolant reclamation arrangement wherein all (or substantially all) of the coolant carried from the coolant reservoir along with the chips by the conveyor is recovered for recycling back to the coolant reservoir. By providing such an arrangement, there would be a decrease in the out-of-pocket expense associated with the cost of the coolant. Such an arrangement would also result in a decrease in the cost of labor associated with filling the coolant reservoir, as well as the handling and transport of the coolant removed from the coolant reservoir.

SUMMARY OF THE INVENTION

In one form thereof, the invention is a coolant reclamation device for use in conjunction with a conveyor of a first width wherein the conveyor receives solid contaminants and coolant from a machine tool operation. The conveyor transports the solid contaminants and coolant to the coolant reclamation device. The coolant reclamation device includes an elongate body which defines a chamber. The elongate body contains an opening which provides direct access to the chamber. A screen is over the opening. The solid contaminants and in coolant are discharged from the conveyor so as to impinge upon the screen. The solid contaminants remain on the surface of the screen. The coolant passes through the screen into the chamber. The elongate body contains a return port through which the chamber is in fluid communication with the coolant reservoir via a conduit.

In another form thereof, the invention is a machine tool coolant reclamation system for use with a machine tool that discharges solid contaminants and coolant. The reclamation system comprises a coolant reservoir that supplies coolant to the machine tool. The system also includes a conveyor of a first width that receives the solid contaminants and coolant from the machine tool wherein a portion of the conveyor is within the coolant reservoir. The system also has a solid contaminant bin. The system includes a coolant reclamation device which comprises an elongate body defining a chamber and containing an elongate opening which provides direct access to the chamber. There is an elongate screen positioned over the opening. The coolant reclamation device is positioned relative to the conveyor so that the solid contaminants and coolant discharged from the conveyor impinge the screen whereby the solid contaminants remain on the surface of the screen and the coolant passes through the screen into the chamber. The elongate body contains a return port through which the chamber is in fluid communication with the coolant reservoir via a conduit.

In still another form thereof, the invention is a machine tool system for removing material from a workpiece wherein the machine tool system comprises a machine tool station that removes material from the workpiece so as to generate solid contaminants and used coolant and a coolant reclamation assembly. The assembly comprises a coolant reservoir that supplies coolant to the machine tool station. The assembly also includes a conveyor of a first width that receives the solid contaminants and the coolant from the machine tool station wherein a portion of the conveyor being within the coolant reservoir. The assembly has a solid contaminant bin and a coolant reclamation device. The coolant reclamation device comprises an elongate body which defines a chamber and contains an elongate opening which provides direct access to the chamber. There is an elongate screen that is positioned over the opening. The coolant reclamation device is positioned relative to the conveyor so that the solid contaminants and coolant discharged from the conveyor impinge the screen whereby the solid contaminants remain on the surface of the screen and the coolant passes through the screen into the chamber. The elongate body contains a return port through which the chamber is in fluid communication with the coolant reservoir via a conduit.

BRIEF DESCRIPTION OF THE DRAWINGS

The following is a brief description of the drawing figures which form a part of this patent application.

DETAILED DESCRIPTION

Figure 1:
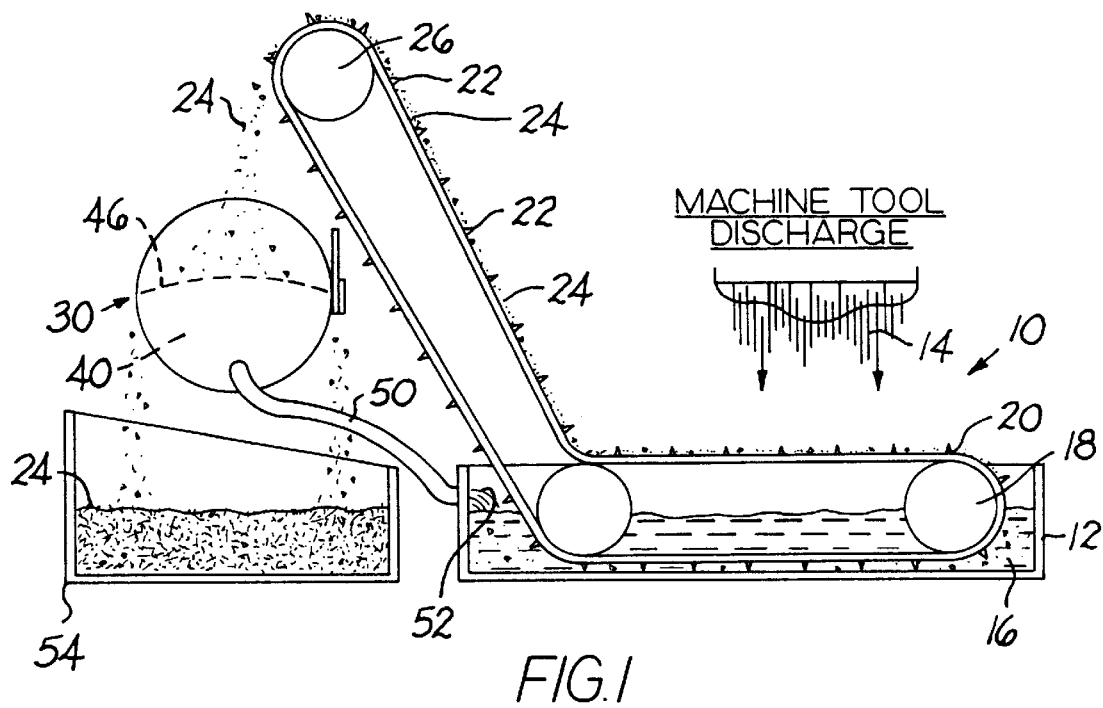
FIG. 1 is a mechanical schematic view of a specific embodiment of a coolant reclamation system.

Referring to the drawings, FIG. 1 depicts a coolant reclamation system generally designated as 10. Coolant reclamation system 10 includes a coolant reservoir 12 which has a conveyor 18 therein. Although not depicted in detail, one skilled in the art is familiar with machine tool systems for the removal of material from a workpiece. In the course of the material removal operation, e.g., machining, there is generated chips (i.e., solid contaminants) whereby the chips and used coolant are discharged so that the conveyor 18 receives used coolant along with chips. Reference numeral 14 points to the combination of the used coolant and the chips from the discharge of the machine tool station. A volume 16 of the used coolant is in the coolant reservoir 12.

The conveyor 18 has a belt 20 with a plurality of upstanding paddles 22 projecting therefrom. When the chips and coolant fall onto the conveyor 18, the conveyor belt 20 carries the chips 24 and the coolant to the upper end 26 of the conveyor 18 where the chips 24 along with any coolant are discharged from the conveyor 18 into the coolant reclamation device 30. The conveyor belt 20 may be fluid permeable so as to permit coolant to pass through the conveyor belt 20 and into the coolant reservoir 12.

Figure 2:
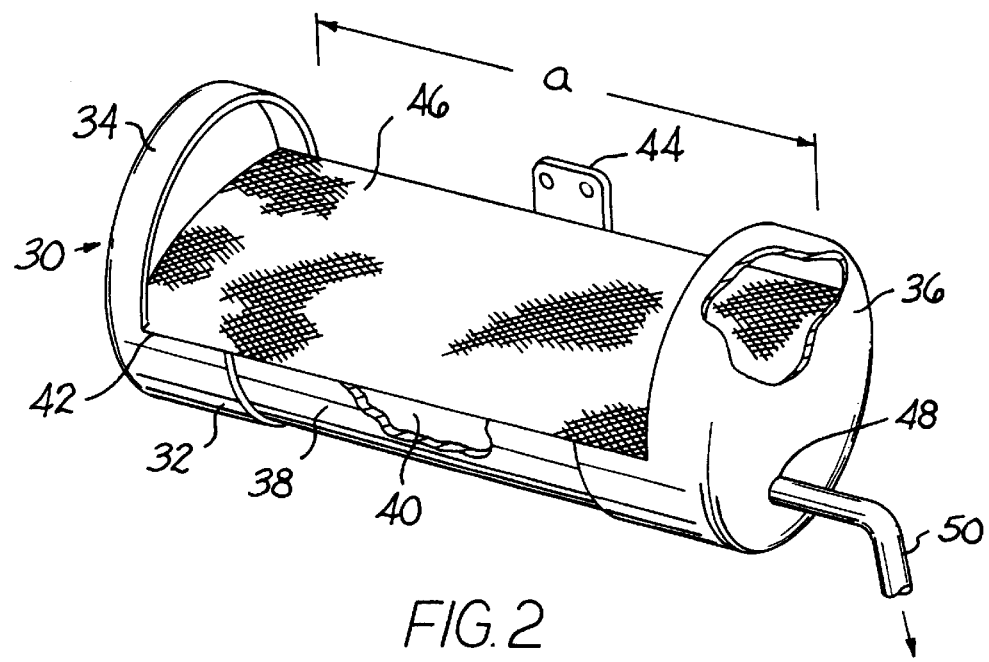
FIG. 2 is a perspective view of the coolant reclamation device of FIG. 1 with a portion of the mediate wall removed and a portion of one end piece removed.

Referring now to FIG. 2, coolant reclamation device 30 includes an elongate body 32 which has one generally circular end piece 34 and an opposite generally circular end piece 36. These end pieces (34, 36) are joined together by a generally cylindrical mediate piece 38, which connects to each one of the end pieces (34, 36). Coolant reclamation device 30 defines a chamber 40, as well as an opening 42, which has longitudinal edges, that provides direct access into the chamber 40. End pieces 34 and 36 are separated from each other by a distance "a".

A bracket 44 extends upwardly from one edge of the mediate piece 38. The bracket 44 may be used to attach the coolant reclamation device 30 to a support (not illustrated) or the like.

An elongate arcuate screen 46, which has longitudinal edges, overlies the opening 42. As will be discussed hereinafter, the arcuate screen 46 presents a convex surface upon which the chips 24 and coolant fall after being discharged from the conveyor 18.

Arcuate screen 46 has an elongate length that extends from the one end piece 34 to the opposite end piece 36. Arcuate screen 46 has an arcuate width which is measured over the convex surface thereof in a direction that is perpendicular to the direction of the length of the screen 46.

While the ratio may vary, one preferred ratio of the arcuate length to the radius of curvature of the screen 46 is about 7:10. In other words, if the arcuate width of the screen 46 is seven inches (17.8 centimeters [cm]) then the radius of curvature of the screen 46 is ten inches (25.4 cm).

The ratio of the arcuate length to the radius of curvature of the screen 46 should be such so that there is enough curvature whereby the chips build up and fall over the edges of the coolant reclamation device 30. Yet, the curvature of the arcuate screen 46 should not be so great so as to result in the chips not having a sufficient dwell time on the convex surface of the screen. An insufficient amount of dwell time on the screen 46 would permit too much coolant to pass into the chip bin 54.

The screen 46 may be made of a ¼th inch 20 gauge expanded metal piece. It should be appreciated that other types and sizes of screens, as well as a screen of another radius of curvature, are appropriate depending upon the specific application.

The opposite end piece 38 contains a port 48 therein which connects to a conduit 50 which provides communication from the chamber 40 to the coolant reservoir 12. A chip bin 54, which contains chips 24 and possibly a slight volume of coolant, is beneath the coolant reclamation device 30.

The used coolant and chips 24 discharged from the upper end 26 of the conveyor 18 fall onto (or impinge) the convex surface of the screen 46 which covers the opening 42 leading to the chamber 40. The chips 24 remain, and tend to build up, on the surface of the screen 46. As long as the chips 24 remain on the screen 46, the coolant passes through the mass of chips 24, as well as through the screen 46, so as to pass into the chamber 40. Once the mass of chips 24 reaches a certain magnitude (or volume), the chips 24 work their way toward, and eventually pass over, the longitudinal edges of the coolant reclamation device 30 (including the screen) and fall into the chip bin 54. The chips 24 remain on the surface of the screen 46 for a dwell time that is sufficiently long so that, at a minimum, most all of the coolant drains from the chips 24 into the chamber 40. This results in the presence in the chip bin 54 of, at the most, very little coolant. The presence of very little, if any, coolant in the chip bin 54 facilitates the disposal of the chips 54 since special measures necessitated by the presence of a meaningful volume of coolant are not needed for the disposal of the chips in the chip bin 54.

The coolant in the chamber 40 exits the chamber 40 via the port 48 and conduit 50 so as to pass into the coolant reservoir 12. A stream of coolant returning via conduit 50 to the coolant reservoir 12 is depicted in FIG. 2 by reference numeral 52.

The following Table I shows the actual savings that were incurred due to the use of the coolant reclamation device in conjunction with four different machine tool arrangements.

Machine Tool No. 1 was a Hitachi-Seiki No. 1143 style of machine tool arrangement. Machine Tool No. 2 was a Hitachi-Seiki No. 1163 style of machine tool arrangement. Machine Tool No. 3 was a Hitachi-Seiki No. 1160 style of machine tool arrangement. Machine Tool No. 4 was a Hitachi-Seiki No. 2059 style of machine tool arrangement.

TABLE I

Usage of Coolant with and without the Coolant Reclamation Device for Four Machine Tool Arrangements

| Coolant Usage | Machine Tool No. 1 | Machine Tool No. 2 | Machine Tool No. 3 | Machine Tool No. 4 | Average for Four Machine Tools | Total for Four Machine Tools |
|---|---|---|---|---|---|---|
| Average GPD* without Coolant Reclamation Device | 9.75 | 10.33 | 20.75 | 17.0 | 14.46 | 57.83 |
| Average GPD* with Coolant Reclamation Device | .5 | .62 | .25 | .5 | .47 | 1.87 |
| GPD* Coolant Savings | 9.25 | 9.71 | 20.5 | 16.5 | 13.99 | 55.96 |

*GPD means gallons per day.

The above results show that it is very apparent that the use of the coolant reclamation device provided for the reclamation of a significant volume of coolant that otherwise would have been discarded. In fact, the use of the coolant reclamation device saved almost 56 gallon per day (GPD) of coolant for the four machine tool arrangements. On an annual basis the use of the coolant reclamation device would save about 13,990 gallons of coolant for these four machine tool arrangements.

It is very apparent that the present invention provides an arrangement by which a significant volume of coolant is saved for recycling back to the coolant reservoir so as to reduce the out-of-pocket costs of the coolant, as well as reduce the cost of labor associated with the machine tool operation.

The patents and other documents identified herein are hereby incorporated by reference herein.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A machine tool coolant reclamation system for use with a machine tool that discharges solid contaminants and coolant, the reclamation system comprising:

a coolant reservoir that supplies coolant to the machine tool;

a conveyor of a first width that receives the solid contaminants and coolant from the machine tool, and a portion of the conveyor being within the coolant reservoir;

a solid contaminant bin;

a coolant reclamation device comprising:

an elongate body defining a chamber, and the elongate body containing an elongate opening which provides direct access to the chamber;

an elongate screen positioned over the opening;

the coolant reclamation device positioned relative to the conveyor so that the solid contaminants and coolant discharged from the conveyor impinge the screen whereby the solid contaminants remain on the surface of the screen and the coolant passes through the screen into the chamber; and the elongate body containing a return port through which the chamber is in fluid communication with the coolant reservoir via a conduit.

2. The coolant reclamation system of claim 1 wherein the screen is arcuate in shape so as to present a convex surface upon which the solid contaminants impinge upon discharge from the conveyor.

3. The coolant reclamation system of claim 2 wherein the screen has longitudinal edges.

4. The coolant reclamation system of claim 3 wherein the degree of curvature of the screen is of a magnitude so as to permit the solid contaminants to build up on the screen and eventually fall over the longitudinal edges of the screen and into the solid contaminant bin.

5. The coolant reclamation system of claim 4 wherein the degree of curvature of the screen is of a magnitude so as to permit the solid contaminants to remain on the screen a sufficient time to allow coolant to pass through the screen and into the chamber.

6. The coolant reclamation system of claim 2 wherein the screen has a elongate length and an arcuate width, the screen has a radius of curvature, and the ratio of the arcuate width to the radius of curvature being about 7:10.

7. The coolant reclamation system of claim 2 wherein the screen has an elongate length, and the elongate length of the screen being greater than the first width of the conveyor.

8. The coolant reclamation system of claim 2 further including a conduit connected to the return port whereby coolant flows from the chamber through the conduit into the coolant reservoir.

9. A machine tool system for removing material from a workpiece, the machine tool system comprising:

a machine tool station that removes material from the workpiece so as to generate solid contaminants and used coolant;

a coolant reclamation assembly that comprises:

a coolant reservoir that supplies coolant to the machine tool station;

a conveyor of a first width that receives the solid contaminants and the coolant from the machine tool station, and a portion of the conveyor being within the coolant reservoir;

a solid contaminant bin;

a coolant reclamation device comprising:

an elongate body defining a chamber, and the elongate body containing an elongate opening which provides direct access to the chamber;

an elongate screen positioned over the opening;

the coolant reclamation device positioned relative to the conveyor so that the solid contaminants and coolant discharged from the conveyor impinge the screen whereby the solid contaminants remain on the surface of the screen and the coolant passes through the screen into the chamber; and the elongate body containing a return port through which the chamber is in fluid communication with the coolant reservoir via a conduit.

10. The machine tool system of claim 9 wherein the screen is arcuate in shape so as to present a convex surface upon which the solid contaminants impinge upon discharge from the conveyor.

11. The machine tool system of claim 10 wherein the screen has longitudinal edges, and the degree of curvature of the screen is of a magnitude so as to permit the solid contaminants to build up on the screen and eventually fall over the longitudinal edges of the screen and into the solid contaminant bin, and the degree of curvature of the screen is of a magnitude so as to permit the solid contaminants to remain on the screen a sufficient time to allow coolant to pass through the screen and into the chamber.

12. The coolant reclamation system of claim 10 wherein the screen has an elongate length, and the elongate length of the screen being greater than the first width of the conveyor.

13. The coolant reclamation system of claim 10 further including a conduit connected to the return port whereby coolant flows from the chamber through the conduit into the coolant reservoir.

* * * * *